United States Patent
Komiyama et al.

(10) Patent No.: US 7,669,413 B2
(45) Date of Patent: Mar. 2, 2010

(54) HYBRID CONSTRUCTION MACHINE

(75) Inventors: Masayuki Komiyama, Hiroshima (JP); Masayuki Kagoshima, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 352 days.

(21) Appl. No.: 11/677,236

(22) Filed: Feb. 21, 2007

(65) Prior Publication Data
US 2007/0214782 A1 Sep. 20, 2007

(30) Foreign Application Priority Data
Mar. 15, 2006 (JP) .............. 2006-070920

(51) Int. Cl.
*F16D 31/02* (2006.01)
(52) U.S. Cl. .......... 60/414; 60/433
(58) Field of Classification Search ........ 60/414, 60/433
See application file for complete search history.

(56) References Cited

U.S. PATENT DOCUMENTS 6,666,022 B1 * 12/2003 Yoshimatsu et al. ......... 60/414
7,086,226 B2 * 8/2006 Oguri ..................... 60/414
7,525,206 B2 * 4/2009 Kagoshima et al. ....... 290/40 C

FOREIGN PATENT DOCUMENTS

| JP | 2003-328397 | 11/2003 |
|----|-------------|---------|
| JP | 2003-329012 | 11/2003 |

* cited by examiner

*Primary Examiner*—Michael Leslie
(74) *Attorney, Agent, or Firm*—Oblon, Spivak, McClelland, Maier & Neustadt, L.L.P.

(57) ABSTRACT

In a hybrid excavator, a hydraulic pump and a generator motor are connected in parallel to an output shaft of an engine and a rotation motor is driven by a battery. The generator motor assists the engine by performing a motor function. Power consumption of each of the hydraulic pump and the rotation motor is detected. The output of the hydraulic pump and the rotation motor is controlled such that the sum of the detected power consumption does not exceed maximum supply power set as the sum of power that can be supplied to the hydraulic pump and the rotation motor.

5 Claims, 7 Drawing Sheets

| OPERATION PATTERN | 1 | 2 | 3 | 4 | 5 | 6 | 7 | 8 | 9 | 10 | 11 |
|---|---|---|---|---|---|---|---|---|---|---|---|
| BOOM OPERATION | ○ | | | | ○ | ○ | ○ | ○ | ○ | ○ | ○ |
| ARM OPERATION | | ○ | | | ○ | | | ○ | ○ | | ○ |
| BUCKET OPERATION | | | ○ | | | ○ | | ○ | | ○ | ○ |
| ROTATING OPERATION | | | | ○ | | | ○ | | ○ | ○ | ○ |
| HYDRAULIC PUMP OUTPUT POWER RATIO $R_p$ (%) | 100 | 100 | 100 | 0 | 100 | 100 | 50 | 100 | 67 | 67 | 75 |
| ROTATION MOTOR OUTPUT POWER RATIO $R_s$ (%) | 0 | 0 | 0 | 100 | 0 | 0 | 50 | 0 | 33 | 33 | 25 |

FIG. 8

HYBRID CONSTRUCTION MACHINE

BACKGROUND OF THE INVENTION

1. Field of the Invention

The present invention relates to a hybrid construction machine which uses both engine power and electric power.

2. Description of the Related Art

Known techniques relating to the present invention will be described. Here, an excavator will be described for illustrative purposes.

Figure 8:
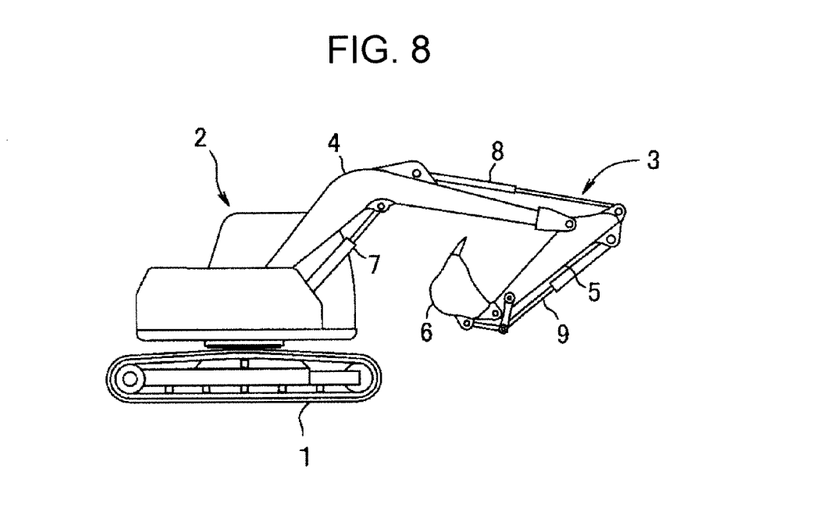
FIG. 8 is a schematic side view of an excavator.

As illustrated in FIG. 8, an excavator includes a crawler-type lower traveling structure 1 and an upper rotating structure 2 rotatably mounted on the lower traveling structure 1. A working attachment 3 is mounted on the upper rotating structure 2. The working attachment 3 includes a boom 4 capable of moving up and down, an arm 5 attached to an end of the boom 4, a bucket 6 attached to an end of the arm 5, and cylinders 7, 8, and 9 which are hydraulic actuators for driving the boom 4, the arm 5, and the bucket 6, respectively.

If the excavator is a hydraulic excavator, a hydraulic motor is used as a rotation actuator for rotating the upper rotating structure 2. On the other hand, if the excavator is a hybrid excavator, a rotation motor, which is an electric actuator, is used as the rotation actuator.

A hybrid excavator of a so-called parallel drive type is known as disclosed in Japanese Unexamined Patent Application Publication No. 2001-12274.

In this parallel-drive-type hybrid excavator, a hydraulic pump and a generator motor performing both a generator function and a motor function are connected in parallel to an engine, which serves as a common power source. The hydraulic pump drives a hydraulic actuator, while an electric storage device drives a rotation motor. The electric storage device is charged by the generator motor. Timely, discharge power of the electric storage device allows the generator motor to assist the engine by performing the motor function.

Therefore, in the parallel-drive-type hybrid excavator, the maximum power of the entire system is determined by the sum of engine power and electric storage device power (i.e., stored electric power).

Since a hybrid excavator is designed to use a small engine, the maximum power of the engine is lower than the maximum output of the hydraulic pump. This deficiency in engine power is made up by the electric storage device via the generator motor.

A problem to be solved by the hybrid excavator is how to provide substantially the same performance and operability as those of a hydraulic excavator with equivalent operating capabilities. Therefore, the maximum system power of the hybrid excavator is determined based on the maximum power (i.e., maximum engine power) of the hydraulic excavator with equivalent operating capabilities and is typically set to be higher than the maximum power of the hydraulic excavator.

However, if the maximum system power of the hybrid excavator is set to be higher than the maximum power of the equivalent hydraulic excavator, the power of the hybrid excavator may exceed an appropriate level depending on a load or the like. Moreover, when an operator operates the hybrid excavator in the same way as in the case of the hydraulic excavator, the resulting movement of an actuator of the hybrid excavator may differ from that of an actuator of the hydraulic excavator. This can be uncomfortable for an operator who is familiar with the operation of the hydraulic excavator. In this respect, the operability of the hybrid excavator becomes worse.

At the same time, even if the maximum system power of the hybrid excavator is set to be higher than the maximum power of the equivalent hydraulic excavator, the maximum system power may be insufficient in the case that a load exceeding the set maximum system power is applied.

In such a case, the hydraulic excavator can cope with power deficiency by performing control to reduce the pump output. However, in the hybrid excavator, which includes the electric storage device as a drive source in addition to the engine, the electric storage device may cause an abnormal voltage drop or over-discharge thereof in an attempt to respond to the applied load. This may shorten the life of the electric storage device or cause damage to the electric storage device. Moreover, if the amount of assist supplied from the electric storage device is insufficient, an excessive load applied to the engine may cause engine stalling. This problem becomes apparent when the hydraulic actuator and the electric actuator are simultaneously operated, because the total loads increase.

The above-described patent document discloses a technique in which, in the hybrid construction machine of a parallel drive type, in the case that the power consumption of the hydraulic pump exceeds engine power, the generator motor performs the motor function while the pump output is reduced. This assists the engine and thus can make the engine revolution speed constant.

However, this technique achieves only a function of efficiently using a small engine, that is, the originally intended function of the hybrid construction machine. In this technique, the pump output is reduced on the basis of only the engine power, not on the basis of the maximum power of the entire system determined by the sum of engine power and electric storage device power. Since this causes unnecessary degradation in operating performance of the hybrid construction machine, its primary object of providing substantially the same performance as that of the equivalent hydraulic construction machine cannot be achieved.

SUMMARY OF THE INVENTION

An object of the present invention is to provide a hybrid construction machine capable of achieving substantially the same performance and operability as those of an equivalent hydraulic excavator. Another object of the present invention is to protect an electric storage device and to prevent engine stalling.

According to an aspect of the present invention, a hybrid construction machine includes an engine, a hydraulic pump connected to an output shaft of the engine, a hydraulic actuator driven by the hydraulic pump, a generator motor connected to the output shaft of the engine to perform a generator function and a motor function, an electric actuator, operation units for operating the respective actuators, an electric storage device which supplies and receives electric power to and from the generator motor and the electric actuator, and a controller for controlling outputs of the hydraulic pump and the electric actuator. The controller detects power consumption of each of the hydraulic pump and the electric actuator. Also, the controller controls the outputs of the hydraulic pump and the electric actuator so that the sum of the detected power consumption does not exceed maximum supply power set as the sum of power that can be supplied to the hydraulic pump and the electric actuator.

In the present invention, maximum supply power is set and the sum of the outputs of the hydraulic pump and the electric actuator is limited so as not to exceed the set maximum supply power. This maximum supply power is set to be substantially the same as the maximum power of a hydraulic construction machine of the same type and with similar operation capabilities to those of the hybrid construction machine of the present invention. Therefore, the hybrid construction machine of the present invention can protect the electric storage device while providing substantially the same performance and operability as those of the equivalent hydraulic construction machine.

First, the present invention can solve the problem of degrading operability of a construction machine, unlike in the case that the maximum supply power is not set and different amounts of actual maximum power is delivered at different times, and unlike in the case that power supplied to the actuators exceeds the power of the equivalent hydraulic construction machine. Second, in the present invention, no limit is placed on the pump output as long as it is within the range of the maximum supply power. Therefore, it is possible to solve the problem of degrading the performance of the machine by unnecessarily reducing the pump output, as is the case for the publicly known technique disclosed in the above patent document. Third, in the present invention, the power consumption of the pump and the electric actuator is controlled so as not to exceed the maximum supply power. Therefore, the electric storage device can be prevented from causing an abnormal voltage drop or over-discharge thereof in an attempt to respond to heavy load particularly during combined operation, and thus, it is possible to solve the problem of causing a reduced life of or damage to the electric storage device and the problem of occurrence of engine stalling.

According to another aspect of the present invention, it is preferable that the controller detects a charging state of the electric storage device and an engine revolution speed, and sets the maximum supply power on the basis of actual maximum system power that can be obtained from the actual charging state of the electric storage device and the actual engine revolution speed.

Since engine power varies with the engine revolution speed at different times and the power of the electric storage device also varies with its charging state, maximum power (i.e., actual maximum system power) that can be actually delivered by the entire system is not necessarily constant. Therefore, it may be possible that the actual maximum system power is below the preset maximum supply power. This will have an adverse effect on the electric storage device.

In the above-described preferred aspect of the present invention, since a set value of the maximum supply power is varied by two factors, i.e., an engine revolution speed and a charging state of the electric storage device, the maximum supply power is set according to the actual maximum system power. Therefore, even in a state where the actual maximum system power is low, no adverse effect on the electric storage device is observed. In other words, the hybrid construction machine can continue its operation while protecting the electric storage device.

According to still another aspect of the present invention, it is further preferable that the controller selects, as the maximum supply power, the lower of either the actual maximum system power or the maximum power of a hydraulic construction machine of the same type and with similar operating capabilities to those of the hybrid construction machine of the present invention. That is, if the actual maximum system power is not higher than the maximum power of the equivalent hydraulic construction machine, the actual maximum system power is selected as the maximum supply power. This can protect the electric storage device while operability may be sacrificed. On the other hand, if the maximum power of the equivalent hydraulic construction machine is lower then the actual maximum system power, the maximum power of the equivalent hydraulic construction machine is selected as the maximum supply power. Thus, the hybrid construction machine of the present invention can provide operability similar to that of the equivalent hydraulic construction machine.

According to another preferred aspect of the present invention, the electric actuator of the hybrid construction machine is a rotation motor. In this case, it is preferable that the controller controls the output of the hydraulic pump so as not to exceed a value obtained by subtracting the power consumption of the rotation motor from the maximum supply power. Thus, since priority is given to supplying power required for rotation during combined operation where rotation and another operation are simultaneously performed, the hybrid construction machine can provide operability close to that of the equivalent hydraulic construction machine which uses a control method in which priority is given to rotation.

According to still another preferred aspect of the present invention, the hybrid construction machine further includes a plurality of hydraulic actuators and an operation amount detector for detecting the amount of operation of the operation units for operating the respective actuators including the electric actuator. In this case, the controller divides the maximum supply power into power to be supplied to the hydraulic pump and power to be supplied to the electric actuator, in accordance with a ratio between the sum of the amounts of operation of the operation units for the respective hydraulic actuators and the amount of operation of the operation unit for the electric actuator. Further, on the basis of this division of power, the controller controls the output of each of the hydraulic pump and the electric actuator. Thus, the hybrid construction machine can provide movements as desired by the operator and provide operability similar to that of the equivalent hydraulic construction machine.

Moreover, it is further preferable if the controller controls the output of each of the hydraulic pump and the electric actuator on the basis of a division ratio preset according to an operation pattern of each operation unit. According to this preferred aspect of the present invention, power division is preset according to an operation pattern of each operation unit. Then, the output of each of the hydraulic pump and the electric actuator is controlled on the basis of the preset division ratio. Therefore, workability and operability that are substantially the same as those of the equivalent hydraulic construction machine can be achieved. Examples of operation patterns of the operation units of the hybrid construction machine include scattering operation and smoothing operation performed by rotating motion.

DESCRIPTION OF THE PREFERRED EMBODIMENTS

Excavators will be described as embodiments of the present invention.

First Embodiment

See FIG. 1 to FIG. 4

Figure 1:
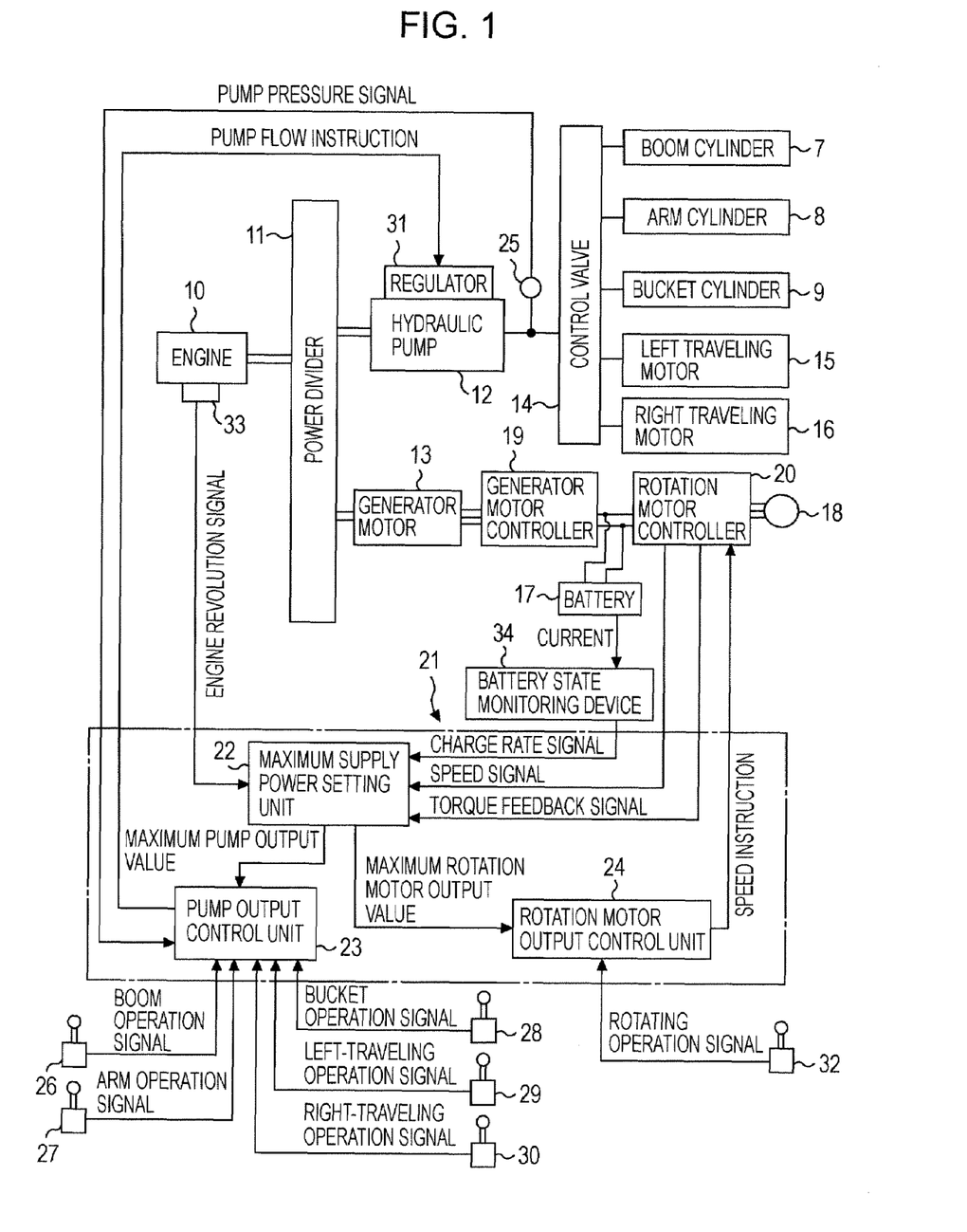
FIG. 1 is a block diagram of a hybrid excavator according to a first embodiment of the present invention.

FIG. 1 is a block diagram of a hybrid excavator according to the present embodiment. As illustrated in FIG. 1, a hydraulic pump 12 and a generator motor 13 which serves both a generator function and a motor function are connected in parallel through a power divider 11 to an engine 10. The hydraulic pump 12 and the generator motor 13 are driven by the engine 10. A plurality of hydraulic actuators is connected through a control valve 14 to the hydraulic pump 12. The control valve 14, which is illustrated as a single entity in FIG. 1, represents a plurality of control valves for the respective hydraulic actuators. The hydraulic actuators include a boom cylinder 7, an arm cylinder 8, a bucket cylinder 9 (equivalent to the cylinders 7, 8, and 9 of FIG. 8), a left traveling motor 15, and a right traveling motor 16. These hydraulic actuators 7, 8, 9, 15, and 16 are driven by pressure oil supplied from the hydraulic pump 12. While FIG. 1 illustrates the case where only one hydraulic pump 12 is provided, there may be cases where a plurality of hydraulic pumps are connected either in series or in parallel.

A battery 17 is provided as an electric storage device serving as a drive source besides the engine 10. Examples of the battery 17 include a lithium ion capacitor. The generator motor 13 and a rotation motor 18, which serves as an electric actuator, are driven by the battery 17 through a generator motor controller 19 and a rotation motor controller 20. The generator motor controller 19 controls switching between the generator function and the motor function of the generator motor 13, electric power to be generated by the generator motor 13, and the current or torque of the generator motor 13 serving as a motor. The generator motor controller 19 also controls charging and discharging of the battery 17 according to the generator output of the generator motor 13. The rotation motor controller 20 controls the current or torque of the rotation motor 18 and thereby controls the rotating direction and rotating speed of the rotation motor 18.

A controller (control means) 21 includes a maximum supply power setting unit 22 for setting the total amount of power that can be supplied, a pump output control unit 23 for controlling the output of the hydraulic pump 12, and a rotation motor output control unit 24 for controlling the output of the rotation motor 18.

The pump output control unit 23 receives inputs indicating pump pressure detected by a pump pressure sensor 25, and operation signals from boom, arm, bucket, left traveling, and right traveling operation units 26, 27, 28, 29, and 30 for operating the hydraulic actuators 7, 8, 9, 15, and 16, respectively. On the basis of these input values and a maximum pump output value set by the maximum supply power setting unit 22, the pump output control unit 23 calculates the tilt value (i.e., pump flow amount) of the hydraulic pump 12 and sends the calculated value to a regulator 31 as an instruction.

On the other hand, the rotation motor output control unit 24 receives a maximum rotation motor output value set by the maximum supply power setting unit 22 and a rotating operation signal from a rotating operation unit 32. On the basis of these received values, the rotation motor output control unit 24 calculates the speed of the rotation motor 18 and sends the calculated value to the rotation motor controller 20 as an instruction.

The maximum supply power setting unit 22 receives an engine revolution speed signal from an engine revolution speed sensor 33, a charge rate signal from a battery state monitoring device 34, and a torque feedback signal and a speed signal from the rotation motor controller 20. On the basis of these input signals, the maximum supply power setting unit 22 calculates maximum engine power, maximum battery power, rotation motor power consumption, and maximum pump output. On the basis of these calculated values, the maximum supply power setting unit 22 sends a maximum pump output value and a maximum rotation motor output value to the pump output control unit 23 and the rotation motor output control unit 24, respectively, as instructions.

The operation of the present embodiment will now be described with reference to the flowcharts of FIG. 2 and FIG. 3.

Figure 2:
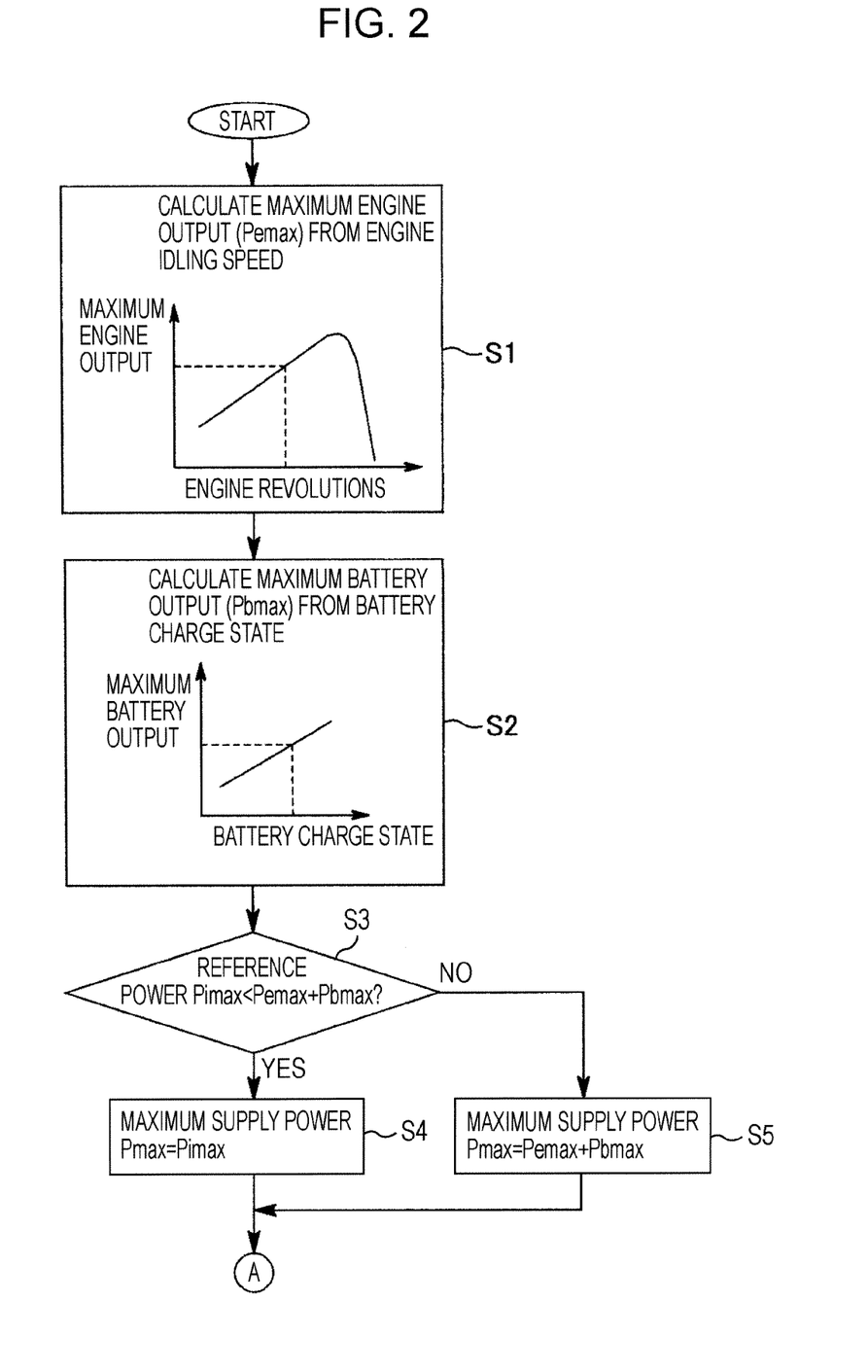
FIG. 2 is a flowchart illustrating operation of the first embodiment.

After start of control, in step S1 of FIG. 2, a maximum engine output Pemax is calculated from an engine idling speed on the basis of the relationship between the engine revolution speed and a maximum engine output illustrated as a graph. Next, in step S2, a maximum battery output Pbmax is calculated from a battery charging state at a given point in time, on the basis of the relationship between a battery charging state and a maximum battery output illustrated as a graph. Next, in step S3, maximum power Pimax of an equivalent hydraulic excavator of the same type and with similar operation capabilities to those of the hybrid excavator of the present embodiment (hereinafter, this maximum power is referred to as reference power) is compared with the sum of the maximum engine output Pemax and the maximum battery output Pbmax calculated in step S1 and step S2, respectively. This sum represents the maximum power that can be actually delivered by the entire system under the conditions of the engine revolution speed and the battery charging state at the given point in time. In the present embodiment, this maximum power is equal to the actual maximum system power. In the case of YES (Pimax<Pemax+Pbmax) in step S3, Pimax is set as maximum supply power Pmax in step S4. In the case of NO (Pimax≧Pemax+Pbmax) in step S3, Pemax+Pbmax is set as maximum supply power Pmax in step S5. In other words, the lower of either the reference power Pimax or the actual maximum system power (Pemax+Pbmax) is selected.

Figure 3:
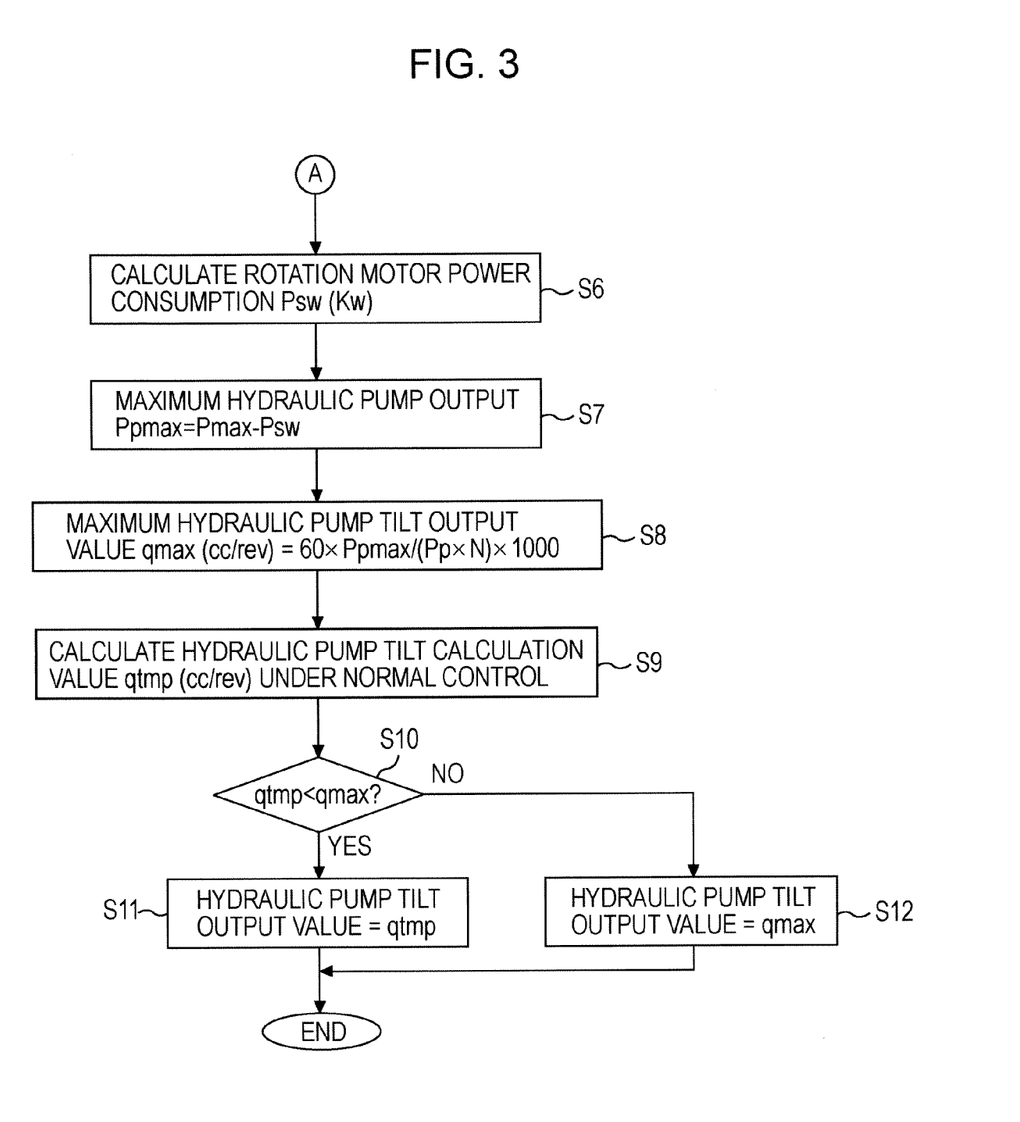
FIG. 3 is a flowchart continued from FIG. 2.
Figure 4:
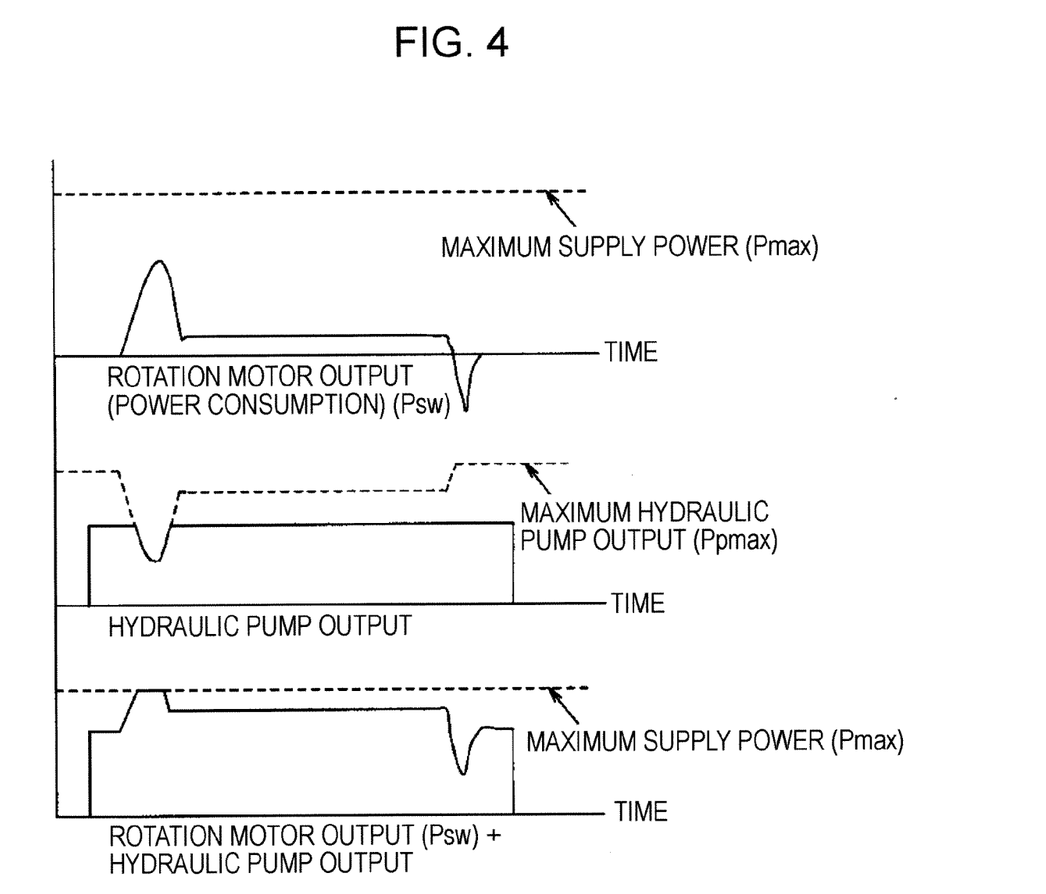
FIG. 4 illustrates a relationship between a rotation motor output and a hydraulic pump output under rotation priority control according to the first embodiment.

In step S6 of FIG. 3, electric power consumption Psw (Kw) of the rotation motor 18 is calculated from a speed wsw (rad/s) and a torque Tsw (N·m) of the rotation motor 18. Next, in step S7, a maximum hydraulic pump output Ppmax is set as Ppmax=Pmax−Psw. That is, as illustrated in FIG. 4, a value obtained by subtracting the electric power consumption Psw of the rotation motor 18 from the maximum supply power Pmax is set as the maximum hydraulic pump output Ppmax. In this case, priority is given to rotating operation. Next, in step S8, on the basis of the maximum hydraulic pump output Ppmax set in step S7 and the detected pump pressure and engine revolution speed, a maximum hydraulic pump tilt output value qmax (cc/rev) is calculated and set. In step S9, a hydraulic pump tilt calculation value qtmp (cc/rev) under normal control is calculated from hydraulic actuator operation signals, pump pressure, and the like. Examples of the normal control include positive control, negative control, and power quality (PQ) control. Then, in step S10, a comparison between the calculated and set tilt values qmax and qtmp is performed. In the case of YES (qtmp<qmax) in step S10, qtmp is selected as a pump tilt output value in step S11. In the case of NO (qtmp≧qmax) in step S10, qmax is selected as a pump tilt output value in step S12.

As described above, in the hybrid excavator of the present embodiment, the maximum supply power Pmax, which is the sum of power that can be supplied to the hydraulic pump 12 and the rotation motor 18, is set with reference to the maximum power of the equivalent hydraulic excavator. Also, the sum of the outputs of the hydraulic pump 12 and the rotation motor 18 is limited so as not to exceed the maximum supply power Pmax. Therefore, the hybrid excavator can protect the battery 17 and prevent engine stalling while providing substantially the same performance and operability as those of the equivalent hydraulic excavator.

In other words, compared to the case where the maximum supply power Pmax is not set and different amounts of actual maximum power that can be delivered by the entire system is delivered at different times, the hybrid excavator of the present embodiment has an advantage in that it is possible to avoid a situation where the amount of power supplied to the actuators exceeds the maximum power of an equivalent hydraulic excavator. Also, the hybrid excavator of the present embodiment can achieve operability close to that of the equivalent hydraulic excavator.

Moreover, in the present embodiment, no limit is placed on the pump output as long as it is within the range of the maximum supply power Pmax. Therefore, it is possible to prevent machine performance from being degraded by unnecessarily reducing the pump output, as is the case for the publicly known technique disclosed in the above patent document.

Additionally, in the present embodiment, the power consumption of the hydraulic pump 12 and the rotation motor 18 is controlled so as not to exceed the maximum supply power Pmax. Therefore, the battery 17 can be prevented from causing an abnormal voltage drop or over-discharge thereof in an attempt to respond to heavy load, particularly during combined operation, and thus leading to a reduced life thereof or being damaged.

In steps S1 to S5 of FIG. 2, (I) the maximum supply power Pmax is set on the basis of the actual maximum system power (Pemax+Pbmax) determined by two factors, the engine revolution speed and a battery charging state; and (II) the lower of either the actual maximum system power (Pemax+Pbmax) or the maximum power Pimax of an equivalent hydraulic excavator is selected.

Therefore, by the above (I), the battery 17 can be prevented from being adversely affected in a state where the actual maximum system power is low. In other words, the hybrid excavator of the present embodiment can continue its operation while protecting the battery 17.

As described in the above (II), if the actual maximum system power is not higher than the maximum power Pimax of the equivalent hydraulic excavator, the actual maximum system power is selected as the maximum supply power Pmax. This can protect the battery 17 while operability may be sacrificed. In addition to this, if the maximum power Pimax of the equivalent hydraulic excavator is lower then the actual maximum system power, the maximum power Pimax is selected, so the hybrid excavator of the present embodiment can provide operability similar to that of the equivalent hydraulic excavator.

In steps S6 and S7 of FIG. 3, the output of the hydraulic pump 12 is controlled so as not to exceed a value obtained by extracting the electric power consumption Psw of the rotation motor 18 from the maximum supply power Pmax. That is, priority is given to power required for rotation. Therefore, the hybrid excavator of the present embodiment can provide operability close to that of the equivalent hydraulic excavator, which uses a control method in which priority is given to rotation during combined operation where rotation and another operation are simultaneously performed.

Second Embodiment

Figure 5:
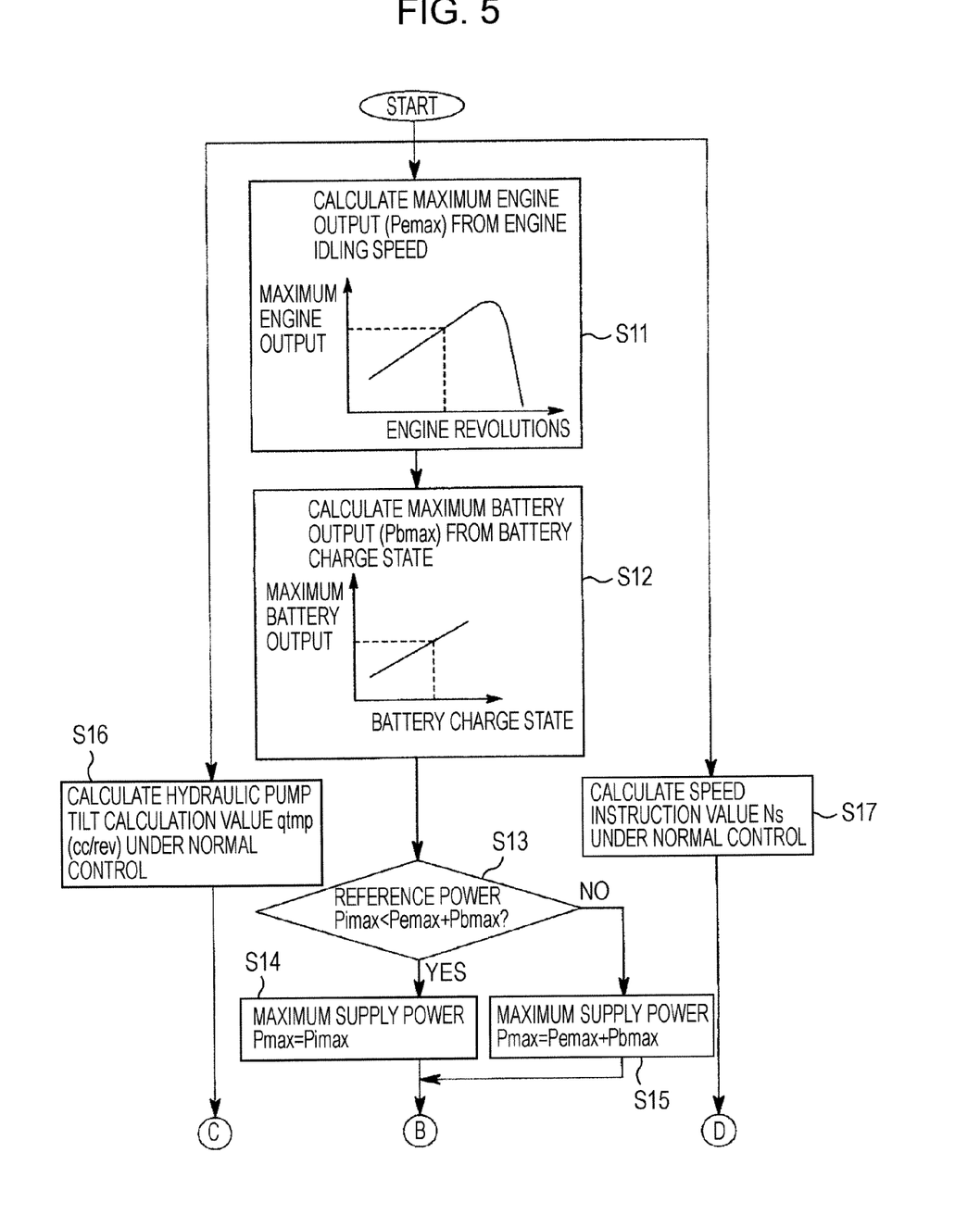
FIG. 5 is a flowchart illustrating operation of a second embodiment of the present invention.
Figure 6:
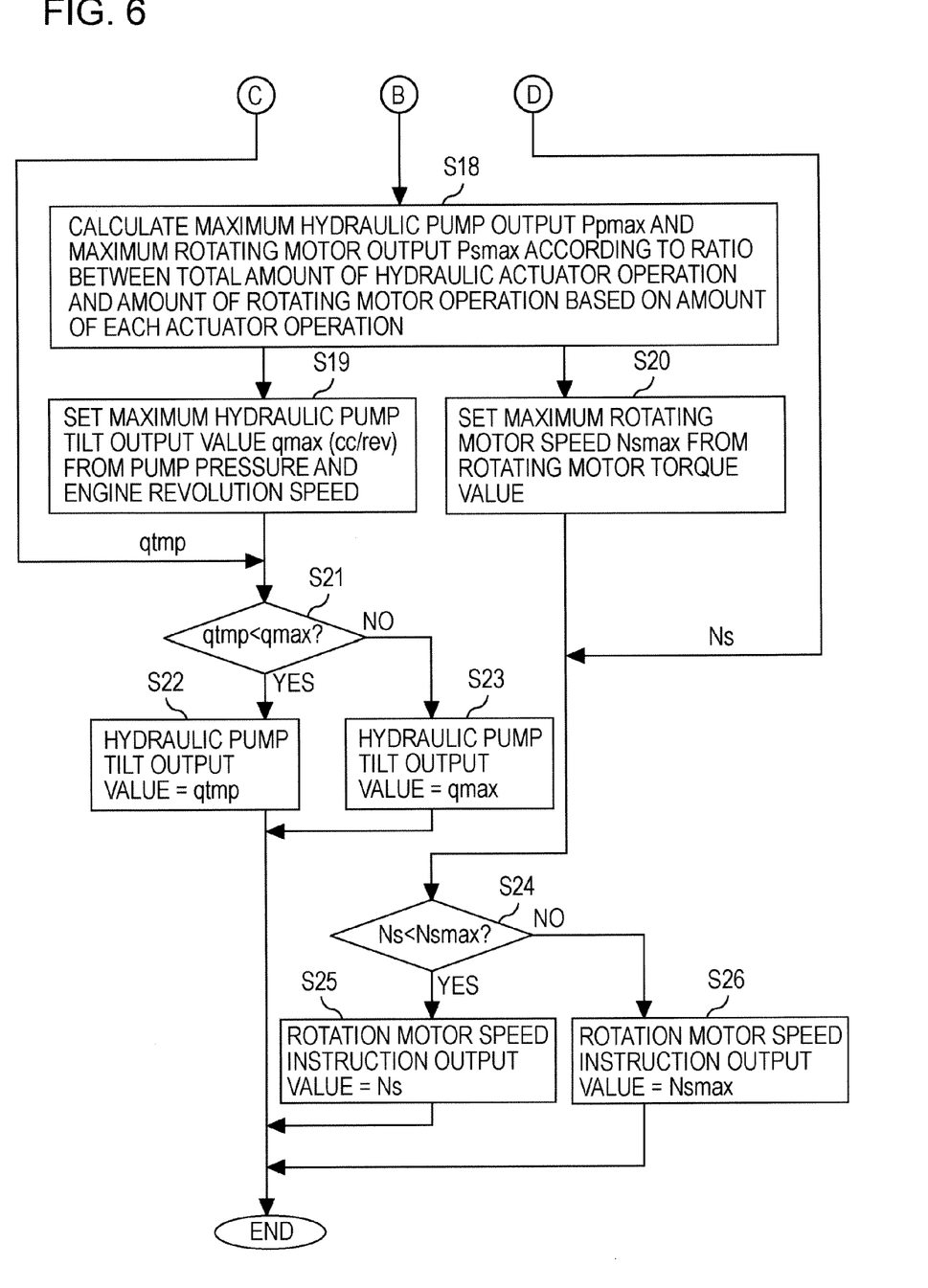
FIG. 6 is a flowchart continued from FIG. 5.

See FIG. 5 and FIG. 6

A block configuration of the second embodiment is the same as that of the first embodiment, and thus an illustration thereof is omitted.

FIG. 5 and FIG. 6 are flowcharts illustrating operation of the second embodiment. Steps S11 to S15 of FIG. 5 are the same as steps S1 to S5 of FIG. 2. In the second embodiment, step S16 and step S17 are performed simultaneously with routines of steps S11 to S15. In step S16, a hydraulic pump tilt calculation value qtmp (cc/rev) under normal control is calculated from hydraulic actuator operation signals, pump pressure, and the like (corresponding to step S9 of FIG. 3). In step S17, a speed instruction value Ns under normal control is calculated from a rotating operation signal and the like.

Subsequently, in step S18 of FIG. 6, on the basis of the amount of operation of each actuator, a ratio between the sum of the amounts of operation of the hydraulic actuators and the amount of operation of the rotation motor 18 is calculated. Next, according to the calculated ratio, the maximum supply power Pmax is divided into a maximum hydraulic pump output Ppmax and a maximum rotation motor output Psmax. In the present embodiment, the sum of the amounts of operation of the hydraulic actuators represents the sum of the amounts of operation of the boom, arm, and bucket cylinders 7, 8, and 9 and the left and right traveling motors 15 and 16. For example, if the amount of rotation represents 50% and the sum of the amounts of operation of the hydraulic actuators represents 50%, the maximum supply power Pmax is equally divided into the maximum rotation motor output Psmax and the maximum hydraulic pump output Ppmax. According to this power division, the maximum hydraulic pump tilt output value qmax (cc/rev) based on the engine revolution speed and pump pressure is set in step S19. At the same time, in step S20, a maximum rotation motor speed Nsmax based on a rotation motor torque value is set.

Next, in steps S21 to S23, the lower of either the maximum hydraulic pump tilt output value qmax or the normal hydraulic pump tilt calculation value qtmp calculated in step S16 is selected as a hydraulic pump tilt output value. At the same time, in steps S24 to S26, the lower of either the maximum rotation motor speed Nsmax or the speed instruction value Ns under normal control calculated in step S17 is selected as a rotation motor speed. Thus, the hydraulic pump tilt output value and the instruction output value for the rotation motor speed are individually calculated. The hydraulic pump tilt and the rotation motor speed are thus controlled according to the calculated output values.

As described above, in the second embodiment, the maximum supply power Pmax is divided into power to be supplied to the hydraulic pump 12 and power to be supplied to the rotation motor 18 according to the ratio between the sum of the amounts of operation of the hydraulic actuators 7, 8, 9, 15, and 16 and the amount of operation of the rotation motor 18. Then, on the basis of this power division, the output of each of the hydraulic pump 12 and the rotation motor 18 is controlled. Thus, the hybrid excavator of the present embodiment can provide movements as desired by the operator and provide operability similar to that of the equivalent hydraulic excavator.

Third Embodiment

Figure 7:
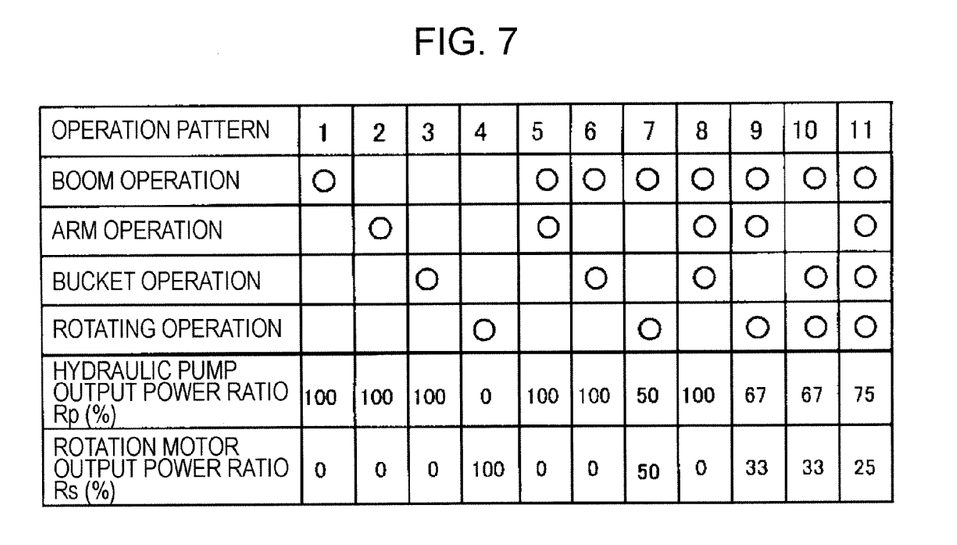
FIG. 7 illustrates a relationship between an operation pattern and a power ratio between a hydraulic pump output and a rotation motor output according to a third embodiment of the present invention.

See FIG. 7

In the third embodiment of the present invention, a maximum hydraulic pump output and a maximum rotation motor output are determined according to an operation pattern, not according to the amount of operation. Hereinafter, only differences from the second embodiment will be described with reference to FIG. 5 and FIG. 6.

After steps S11 to S17 of FIG. 5, in a step corresponding to step S18 of FIG. 6, a maximum hydraulic pump output and a maximum rotation motor output are determined on the basis of a hydraulic pump output power ratio Rp and a rotation motor output power ratio Rs which are preset, as shown in FIG. 7, in relation to operation patterns of the actuators.

For example, in operation pattern 9 in FIG. 7, if boom operation, arm operation, and rotating operation are simultaneously performed, the hydraulic pump output power ratio Rp and the rotation motor output power ratio Rs are 67% (2/3) and 33% (1/3), respectively. According to these ratios, the maximum supply power Pmax is divided into a hydraulic pump output and a rotation motor output.

It is noted in the third embodiment that an operation pattern is determined by the type of work, such as scattering or smoothing of the ground by rotating motion, carried out by the hybrid excavator. In other words, since the output of each of the hydraulic pump 12 and the rotation motor 18 is controlled on the basis of a power division ratio preset according to the operation pattern, workability and operability similar to those of an equivalent hydraulic excavator can be achieved.

Other Embodiments (1) In each of the embodiments described above, a hybrid excavator using a rotation motor as an electric actuator has been described for illustrative purposes. The present invention is also applicable to other hybrid excavators using an electric actuator besides a rotation motor. If such hybrid excavator includes a plurality of electric actuators, the total output of the plurality of electric actuators is controlled along with a pump output.

(2) The hybrid excavator of each of the above-described embodiments is configured so that the maximum supply power Pmax is automatically set. The hybrid excavator of the present invention may also be configured so that the maximum supply power Pmax is preset as a fixed value (e.g., a value close to the value of reference power Pimax) and the sum of the outputs of the pump and the electric actuator is controlled so as not to exceed the fixed value.

(3) The hybrid excavator of each of the above-described embodiments is configured so that the actual maximum system power is calculated by adding the maximum engine output Pemax determined by the engine revolution speed to the maximum battery output Pbmax determined by the battery charging state (e.g., steps S1 and S2 of FIG. 2). The hybrid excavator of the present invention may also be configured so that one of the maximum engine output and the battery charging state is preset as a fixed value and added to the other (i.e., variable value) to determine the actual maximum system power.

(4) The hybrid excavator of each of the above-described embodiments is configured such that the maximum supply power Pmax is determined by selecting the lower of either the actual maximum system power or the reference power Pimax (e.g., steps S3 to S5 of FIG. 2). The hybrid excavator of the present invention may also be configured so that the actual maximum system power itself is set as the maximum supply power Pmax.

(5) The hybrid excavator of the second embodiment is configured so that the maximum supply power Pmax is divided according to the ratio between the sum of the amounts of operation of the hydraulic actuators and the amount of operation of the rotation motor (i.e., the amount of operation of the electric actuator). On the other hand, the hybrid excavator of the third embodiment is configured so that the maximum supply power Pmax is divided according to the operation pattern. The hybrid excavator of the present invention may also be configured so that the maximum supply power Pmax is divided according to a work mode preselected with a selector switch from a plurality of work modes (e.g., scattering mode and smoothing mode in which smoothing is performed by rotating motion).

Although the invention has been described with reference to the preferred embodiments in the attached figures, it is noted that equivalents may be employed and substitutions may be made herein without departing from the scope of the invention as recited in the claims.

What is claimed is:

1. A hybrid construction machine comprising:
an engine;
a hydraulic pump connected to an output shaft of the engine;
a hydraulic actuator driven by the hydraulic pump;
a generator motor connected to the output shaft of the engine to perform a generator function and a motor function;
an electric actuator;
operating means for operating the hydraulic actuator and the electric actuator;
an electric storage device which supplies and receives electric power to and from the generator motor and the electric actuator; and
control means for controlling outputs of the hydraulic pump and the electric actuator, wherein the control means detects power consumption of each of the hydraulic pump and the electric actuator, and controls the outputs of the hydraulic pump and the electric actuator so that the sum of the detected power consumption does not exceed a maximum supply power set as the sum of power that can be supplied to the hydraulic pump and the electric actuator, wherein the control means determines the maximum power supply by detecting a charging state of the electric storage device and an engine revolution speed, and setting the maximum supply power on the basis of actual maximum system power that can be obtained from the actual charging state of the electric storage device and the actual engine revolution speed.

2. The hybrid construction machine according to claim 1, wherein the control means selects, as the maximum supply power, the lower of either the actual maximum system power or the maximum power of a hydraulic construction machine of the same operating capabilities as those of the hybrid construction machine.

3. The hybrid construction machine according to claim 1, wherein the electric actuator is a rotation motor; and the control means controls the output of the hydraulic pump so as not to exceed a value obtained by subtracting the power consumption of the rotation motor from the maximum supply power.

4. The hybrid construction machine according to claim 1, further comprising:

operation amount detecting means for detecting the amount of operation of the operating means for operating the respective actuators including the electric actuator; and a plurality of hydraulic actuators, wherein the control means divides the maximum supply power into power to be supplied to the hydraulic pump and power to be supplied to the electric actuator according to a ratio between the sum of the amounts of operation of the operating means for the respective hydraulic actuators and the amount of operation of the operating means for the electric actuator, and, on the basis of this division, controls the output of each of the hydraulic pump and the electric actuator.

5. The hybrid construction machine according to claim 1, further comprising:

operation amount detecting means for detecting the amount of operation of the operating means for operating the respective actuators including the electric actuator; and a plurality of hydraulic actuators, wherein the control means controls the output of each of the hydraulic pump and the electric actuator on the basis of a division ratio preset according to an operation pattern of the operating means.

* * * * *